US012190642B2

(12) United States Patent
Shetty et al.

(10) Patent No.: US 12,190,642 B2
(45) Date of Patent: Jan. 7, 2025

(54) SYSTEMS AND METHODS FOR PREVENTING BIOMETRIC INFRINGEMENT

(71) Applicant: Mastercard International Incorporated, Purchase, NY (US)

(72) Inventors: Kaushal Naveen Shetty, Thane (IN);
Sachin Kumar Singh, Pune (IN);
Amandeep Batra, Dublin (IE);
Venkata Satya Sivajee Pinnamaneni, Dardenne Prairie, MO (US)

(73) Assignee: Mastercard International Incorporated, Purchase, NY (US)

( * ) Notice: Subject to any disclaimer, the term of this patent is extended or adjusted under 35 U.S.C. 154(b) by 0 days.

(21) Appl. No.: 18/160,335

(22) Filed: Jan. 27, 2023

(65) Prior Publication Data
US 2024/0257560 A1    Aug. 1, 2024

(51) Int. Cl.
*G06V 40/12*    (2022.01)
*G06F 21/32*    (2013.01)
*G06V 40/50*    (2022.01)

(52) U.S. Cl.
CPC .............. *G06V 40/50* (2022.01); *G06F 21/32* (2013.01); *G06V 40/1359* (2022.01); *G06V 40/1376* (2022.01)

(58) Field of Classification Search
CPC .............. G06V 40/50; G06V 40/1359; G06V 40/1365; G06V 40/1371; G06V 40/1376
See application file for complete search history.

(56) References Cited

U.S. PATENT DOCUMENTS

| | | | |
|---|---|---|---|
| 6,963,660 B1* | 11/2005 | Tsukamura | G06V 40/1365 348/161 |
| 2011/0019918 A1* | 1/2011 | Monden | G06V 40/1365 382/190 |
| 2016/0147987 A1* | 5/2016 | Jang | G06V 40/1365 726/19 |
| 2017/0372049 A1* | 12/2017 | Tieu | G06F 21/32 |
| 2018/0108020 A1* | 4/2018 | Thatte | H04L 9/0866 |
| 2020/0167540 A1* | 5/2020 | Kim | G06F 3/041 |
| 2021/0350105 A1* | 11/2021 | Krenzer | G06V 40/1347 |
| 2022/0270723 A1* | 8/2022 | Schneider | G16H 40/67 |

* cited by examiner

*Primary Examiner* — Yuzhen Shen
(74) *Attorney, Agent, or Firm* — Hovey Williams LLP

(57) ABSTRACT

Registering a biometric template with a computing device includes receiving a first scan of a biometric feature from a biometric sensor. The first scan includes first biometric data. The computing device extracts two or more distinct elements of the biometric feature and writes a biometric template to a memory. The first characterization data for each of the two or more distinct elements is recorded in the biometric template. After recording the first characterization data in the biometric template, the computing device receives an additional scan of the biometric feature from the biometric sensor. The additional scan includes second biometric data. The computing device validates the biometric template against the second biometric data. After validating the biometric template, the biometric template is updated with second characterization data. The second characterization data is associated with two or more additional distinct elements of the biometric feature contained in the second biometric data.

20 Claims, 7 Drawing Sheets

SYSTEMS AND METHODS FOR PREVENTING BIOMETRIC INFRINGEMENT

FIELD OF THE DISCLOSURE

The field of the disclosure relates generally to user authentication using biometric information and, more particularly, to systems and methods for improving authentication security by ensuring that a stored biometric template or profile is associated with a single user's biometric feature.

BACKGROUND OF THE DISCLOSURE

User authentication, via digital identity technology, typically relies on a biometric sensor that is incorporated into a computing device, such as an optical scanner, an ultrasound scanner, a capacitive scanner, and the like. A user's biometric feature is then used to authenticate the user. In this manner, a user can authenticate a transaction, for example, within fractions of a second by placing his or her finger on the sensor, looking at the sensor, etc. There is a flaw, however, in many biometric registration processes. Current biometric sensors and registration processes cannot determine whether a single user is performing a biometric registration process, or more than one user is performing the registration process. Consequently, two or more users can register their respective biometric feature (e.g., a fingerprint) on a single device during a single registration process. As such, any user that participated in the registration process may be subsequently authenticated by the single stored biometric template or profile. This enables any one of the registered users to perform a fraudulent activity by purporting to be any one of the other registered users.

BRIEF DESCRIPTION OF THE DISCLOSURE

This brief description is provided to introduce a selection of concepts in a simplified form that are further described in the detailed description below. This brief description is not intended to identify key features or essential features of the claimed subject matter, nor is it intended to be used to limit the scope of the claimed subject matter. Other aspects and advantages of the present disclosure will be apparent from the following detailed description of the embodiments and the accompanying figures.

In one aspect, a computer-implemented method is provided. The method is performed by a computing device. The method includes receiving a first scan of a biometric feature of a user from a biometric sensor. The first scan includes first biometric data. The method also includes extracting two or more distinct elements of the biometric feature from the first biometric data and writing a biometric template to a memory device of the computing device. Furthermore, the method includes recording first characterization data for each of the two or more distinct elements in the biometric template. After recording the first characterization data in the biometric template, the method includes receiving an additional scan of the biometric feature from the biometric sensor. The additional scan includes second biometric data. In addition, the method includes validating the biometric template against the second biometric data. Moreover, the method includes updating the biometric template with second characterization data after validating the biometric template. The second characterization data is associated with two or more additional distinct elements of the biometric feature contained in the second biometric data.

In another aspect, a computing device is provided. The computing device includes a biometric sensor, a processor, and a memory device. The memory device includes computer-readable instructions stored thereon, that when executed by the processor, cause the processor to perform operations that include receiving a first scan of a biometric feature of a user from the biometric sensor. The first scan includes first biometric data. The processor extracts two or more distinct elements of the biometric feature from the first biometric data and writes a biometric template to the memory device. Furthermore, the processor records first characterization data for each of the two or more distinct elements in the biometric template. After recording the first characterization data in the biometric template, the processor receives an additional scan of the biometric feature from the biometric sensor. The additional scan includes second biometric data. Moreover, the processor validates the biometric template against the second biometric data and, after validating the biometric template, updates the biometric template with second characterization data. The second characterization data is associated with two or more additional distinct elements of the biometric feature contained in the second biometric data.

In yet another aspect, a non-transitory computer readable storage medium is provided. The non-transitory computer readable storage medium includes computer readable instructions that, when executed by a processor, cause the processor to perform operations that include receiving a first scan of a biometric feature of a user from a biometric sensor. The first scan includes first biometric data. The instructions also cause the processor to perform operations that include extracting two or more distinct elements of the biometric feature from the first biometric data and writing a biometric template to a memory device of the computing device. Furthermore, the instructions also cause the processor to perform operations that include recording first characterization data for each of the two or more distinct elements in the biometric template. After recording the first characterization data in the biometric template, the instructions cause the processor to perform operations that include receiving an additional scan of the biometric feature from the biometric sensor. The additional scan includes second biometric data. In addition, the instructions cause the processor to perform operations that include validating the biometric template against the second biometric data. Moreover, the instructions cause the processor to perform operations that include updating the biometric template with second characterization data after validating the biometric template. The second characterization data is associated with two or more additional distinct elements of the biometric feature contained in the second biometric data.

A variety of additional aspects will be set forth in the detailed description that follows. These aspects can relate to individual features and to combinations of features. Advantages of these and other aspects will become more apparent to those skilled in the art from the following description of the exemplary embodiments which have been shown and described by way of illustration. As will be realized, the present aspects described herein may be capable of other and different aspects, and their details are capable of modification in various respects. Accordingly, the figures and description are to be regarded as illustrative in nature and not as restrictive.

BRIEF DESCRIPTION OF THE DRAWINGS

The figures described below depict various aspects of systems and methods disclosed therein. It should be understood that each figure depicts an embodiment of a particular aspect of the disclosed systems and methods, and that each of the figures is intended to accord with a possible embodiment thereof. Further, wherever possible, the following description refers to the reference numerals included in the following figures, in which features depicted in multiple figures are designated with consistent reference numerals.

Unless otherwise indicated, the figures provided herein are meant to illustrate features of embodiments of this disclosure. These features are believed to be applicable in a wide variety of systems comprising one or more embodiments of this disclosure. As such, the figures are not meant to include all conventional features known by those of ordinary skill in the art to be required for the practice of the embodiments disclosed herein.

DETAILED DESCRIPTION OF THE DISCLOSURE

The following detailed description of embodiments of the invention references the accompanying figures. The embodiments are intended to describe aspects of the invention in sufficient detail to enable those with ordinary skill in the art to practice the invention. The embodiments of the invention are illustrated by way of example and not by way of limitation. Other embodiments may be utilized, and changes may be made without departing from the scope of the claims. The following description is, therefore, not limiting. The scope of the present invention is defined only by the appended claims, along with the full scope of equivalents to which such claims are entitled.

Exemplary Computing Device

Figure 1:
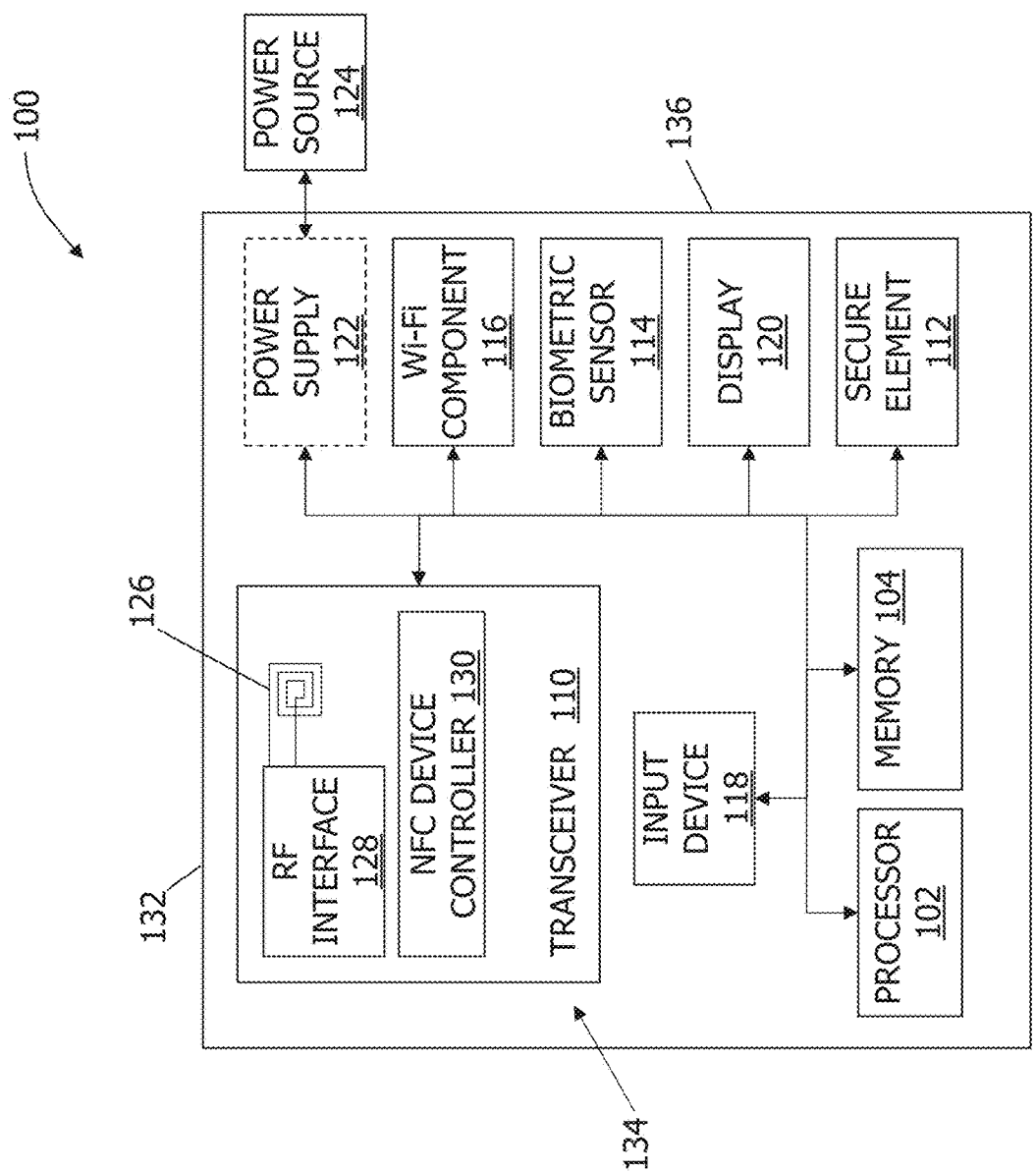
FIG. 1 is an example configuration of a computing device, such as a mobile computing device or mobile phone, that may be operated by a user as a biometric data registration device, according to one aspect of the present invention.

FIG. 1 is an example configuration of a computing device 100, such as a mobile computing device or mobile phone, that may be operated by a user as a biometric data registration device, according to one aspect of the present invention. The skilled person will understand that various elements of the computing device 100 may be replaced by similar functional elements or may not be necessary in every embodiment.

In the exemplary embodiment, the computing device 100 generally includes a processor 102, a memory device 104, a transceiver 110 (or a wireless communication device), a secure element 112, and a biometric sensor 114. In addition, the computing device 100 includes an integrated Wi-Fi component 116 (e.g., implementing the Institute of Electrical and Electronics/IEEE 802.11 family of standards), an input device 118, and a display 120. Moreover, the computing device 100 optionally includes an internal power supply 122 (e.g., a battery or other self-contained power source) to receive power, or alternatively, in some embodiments, the computing device 100 may include an external power source 124.

The processor 102 includes one or more processing units (e.g., in a multi-core configuration) specially programmed for executing computer readable instructions. The computer readable instructions may be executed within a variety of different operating systems (OS) on the mobile device 40, such as UNIX, LINUX, Microsoft Windows®, etc. More specifically, the instructions may cause various data manipulations on data stored in the memory device 104 (e.g., create, read, write, update, and delete procedures). It should also be appreciated that upon initiation of a computer-based method, various computer readable instructions may be executed during initialization. Some operations may be required to perform one or more processes described herein, while other operations may be more general and/or specific to a programming language (e.g., C, C#, C++, Java, or other suitable programming languages, etc.).

In the example embodiment, the processor 102 may be implemented as one or more cryptographic processors. A cryptographic processor may include, for example, dedicated circuitry and hardware such as one or more cryptographic arithmetic logic units (not shown) that are optimized to perform computationally intensive cryptographic functions. A cryptographic processor may be a dedicated microprocessor for carrying out cryptographic operations, embedded in a packaging with multiple physical security measures, which facilitate providing a degree of tamper resistance. A cryptographic processor facilitates providing a tamper-proof boot and/or operating environment, and persistent and volatile storage encryption to facilitate secure, encrypted transactions.

Because the computing device 100 may be widely deployed, it may be impractical to manually update software for each computing device 100. Therefore, the network system 10 provides a mechanism for automatically updating the software on the computing device 100. For example, an updating mechanism may be used to automatically update any number of components and their drivers, both network and non-network components, including system level (OS) software components. In some embodiments, the components of the computing device 100 are dynamically loadable and unloadable; thus, they may be replaced in operation without having to reboot the OS.

The memory device 104 is configured to store data, such as computer executable instructions and/or written works, for use by the computing device 100 in performing the functions described herein. The memory device 104 is configured to store data using suitable data formatting methods and schema. The memory device 104 includes, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only and are thus not limiting as to the types of memory usable for storage of a computer program. In certain embodiments, the memory device 104 may be comprised of or may otherwise include a relational database that utilizes structured query language for the storage, identification, modifying, updating, accessing, etc. of structured data sets stored therein. In some instances, the memory device 104 is used to store an encrypted biometric template following a biometric registration process, as described herein.

In the exemplary embodiment, the secure element 112 is configured to securely store program code and data associated with one or more trusted applications, cryptographic tools (e.g., cryptographic keys, etc.) used to encrypt a biometric template during the biometric registration process, store one or more encrypted biometric templates, and/or perform certain cryptographic operations, such as deriving cryptographic keys based on master keys, encrypting data, and decrypting encrypted data. It is noted that, in embodiments of the disclosure, the secure element 112 is subject to heightened security protocols and practices, as will be apparent to persons skilled in the relevant art.

The Wi-Fi component 116 (broadly, a communication interface) is communicatively connectable to a remote computing device. The Wi-Fi component 116 includes, for example, a wireless or wired network adapter or a wireless data transceiver for use with Wi-Fi (e.g., implementing the Institute of Electrical and Electronics/IEEE 802.11 family of standards), Bluetooth communication, radio frequency (RF) communication, near field communication (NFC), and/or with a mobile phone network, Global System for Mobile communications (GSM), 4G, 5G, or other mobile data network, and/or Worldwide Interoperability for Microwave Access (WiMax) and the like.

Stored in the memory device 104, such as the standard storage 106, are, for example, computer readable instructions for providing a user interface to a user (not shown) via the display 120 and, optionally, receiving and processing input from the input device 118. A user interface may include, among other possibilities, a web browser, an application, and the like. Web browsers enable users to display and interact with media and other information typically embedded on a web page or a website. An application, for example, may allow a user to interact with the TEE 108 and/or secure element 112, for example, when registering biometric data for user authentication.

In the example embodiment, the display 120 includes, for example, and without limitation, a liquid crystal display (LCD), a light emitting diode (LED) display, an organic light emitting diode (OLED) display, or an "electronic ink" display. In some embodiments, a single component such as a touch screen may function as both an output device (e.g., the display 120) and the input device 118. As such, the display 120 may optionally include a touch controller for support of touch capability. In such embodiments, the computing device 100 may detect a user's presence by detecting that the user has touched the display 120 of the computing device 100.

In the example embodiment, the biometric sensor 114 incudes, for example, a fingerprint scanner configured to scan or read a user's fingerprint when a user's finger is placed on the fingerprint scanner. In this manner, a user can register (i.e., store) his or her fingerprint data on the user device 100 for subsequently authenticating the identity of the user. While a user's fingerprint is described herein in relation to biometric data, it is contemplated that the biometric sensor 114 can optionally include a camera, an optical imager, a retinal scanner, a microphone, a heart rate monitor, etc. Thus, the biometric data obtained via the biometric sensor 114 and used to generate the encrypted biometric template described herein, may include fingerprint data, facial feature data, retinal scan data, vein pattern data, heart rate data, etc. Thus, it is noted that the biometric data and template generation techniques described herein are not limited to a particular biometric data type.

In the example embodiment, the computing device 100 includes a housing 132 at least partly (and more preferably, at least substantially or entirely) enclosing the components described above. In addition, the computing device 100 includes circuitry 134 configured to communicate with a network and/or other computing devices (e.g., other mobile devices, POS terminals, etc.). The circuitry 134 includes, for example, leads, connectors, NFC-enabled circuitry, Wi-Fi-enabled circuitry, and sensor circuitry. The housing 132 is preferably configured to seal the circuitry 134, which is susceptible to degradation from the ambient environment. In one embodiment, the circuitry 134 is hermetically sealed in the housing 132. For example, in one embodiment, the circuitry 134 is completely and permanently encased within the housing 132. In other words, the housing 132 and the circuitry 134 are intended to remain as a single, inseparable unit throughout the life of the computing device 100. It is understood that the housing 132 can be formed separately from the circuitry 134 and that the circuitry 134 can be placed into and sealed within the housing 132 in a separate operation. It is also understood that the housing 132 can be oversized with respect to the circuitry 134 so that the circuitry 134 can be placed loosely into the housing 132. In another embodiment, the circuitry 134 can be selectively, sealingly enclosed within the housing 132, where the housing 132 includes a closure 136 removably attached to a body of the housing 132.

The housing 132 is fabricated from a suitably selected material that facilitates inhibiting the effect the material has on a signal being emitted from, for example, the transceiver 110 and/or the Wi-Fi component 116 and passing through the housing material. For example, and without limitation, suitable materials from which the housing 132 may be fabricated include polyethylene, propylene, isoprene, and butylenes (i.e., polyolefins). In other embodiments, the housing 132 is fabricated from any material (such as metals, etc.) that enables the computing device 100 to function as described herein.

In an embodiment, the transceiver 110 includes an antenna 126. The antenna 126 includes a looped wire configured to transmit radio signals when current flows through the looped wire. The antenna 126 is any size, shape, and configuration that is suitable for transmitting signals as described herein. For example, the antenna 126 is a tuned circuit configured to transmit radio signals in any radio-based communication system including, but not limited to, Radio Frequency Identification (RFID), Wireless Local Area Network (WLAN), and Wireless Personal Area Network (WPAN) systems. In the example embodiment, the antenna 126 generates a magnetic field when it vibrates at a selected frequency. Specifically, the antenna 126 is configured to vibrate at a frequency of about 13.56 MHz, which is suitable for use in a near field communication (NFC) system.

In the example embodiment, the antenna 126 transmits radio signals to and receives radio signals from other wireless-enabled computing devices, for example, another mobile device, a merchant point-of-sale (POS) terminal, and/or any other components used in wireless systems. In NFC systems, for example, at least one NFC component generates a magnetic field to inductively transfer currents and, thereby, exchange signals and information with other NFC components positioned within the magnetic field. In one example embodiment, the antenna 126 functions as an NFC component to send and receive signals. The antenna 126 is configured to transmit radio signals to NFC components positioned within the magnetic field of the antenna 126, such as when the computing device 100 is positioned within a predetermined distance of a POS terminal. Therefore, the magnetic field generated by the antenna 126 defines the active range of the computing device 100. Additionally, the antenna 126 receives radio signals from NFC components when the antenna 126 is positioned within the magnetic field of the NFC components.

The transceiver 110 also includes a radio frequency (RF) interface 128 and an NFC device controller 130. The RF interface 128 and the NFC device controller 130 are powered by the power source 124, and in some embodiments, the internal power supply 122 and/or the display 120. In addition, the processor 102 and the memory device 104 are powered in the same manner. The RF interface 128 is configured to receive and transmit RF signals through the antenna 126. The NFC device controller 130 is configured to process the received RF signals and to generate signals to be transmitted by the RF interface 128. The memory device 104 is configured to store data associated with transmitting and receiving the RF signals. The NFC device controller 130 is coupled in communication with the processor 102.

In some embodiments, the computing device 100 may be connected to one or more peripheral devices (not shown). That is, the computing device 100 may communicate various data with one or more peripheral devices. For example, the computing device 100 may communicate with one or more peripheral devices through the Wi-Fi component 116, the transceiver 110, or other suitable means.

Figure 2:
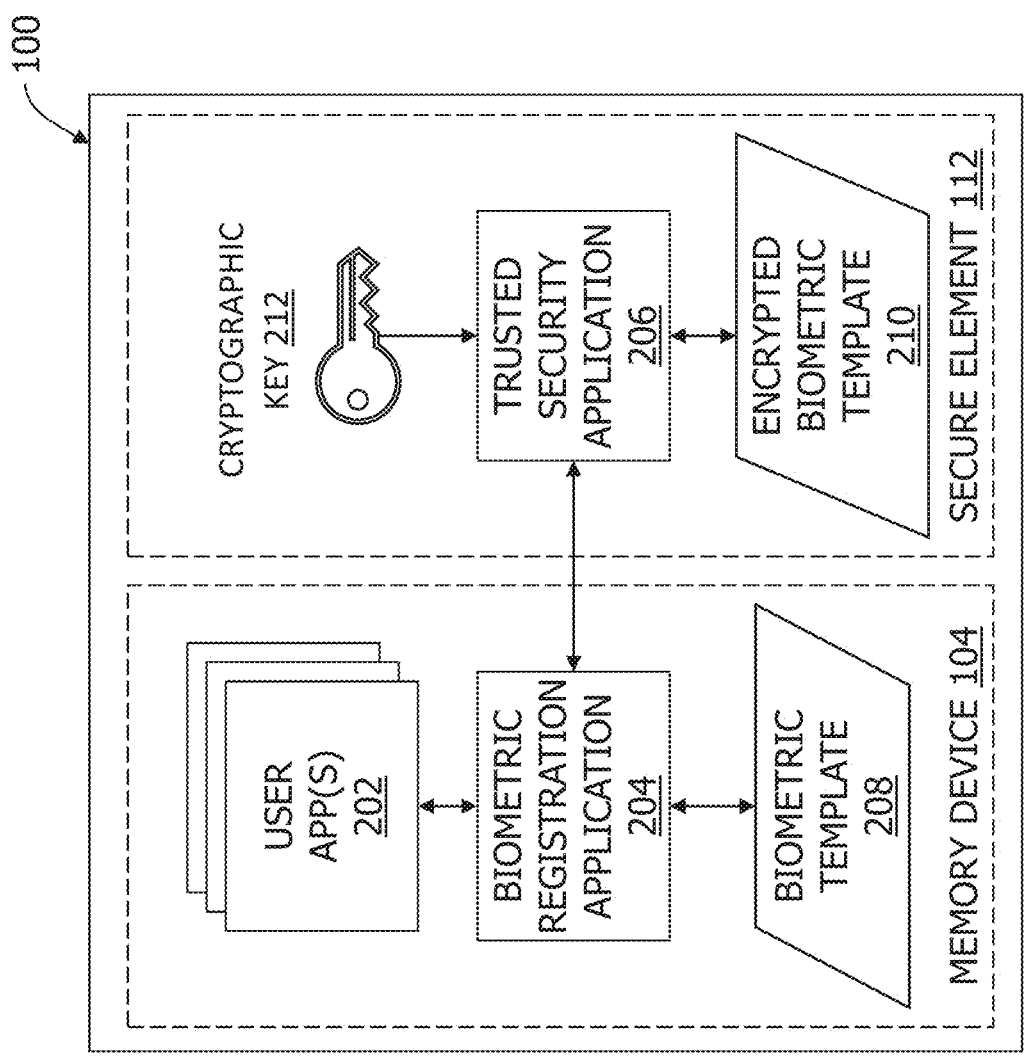
FIG. 2 is a block diagram of a system architecture of the computing device of FIG. 1 for registering a biometric template with the computing device.

FIG. 2 is a block diagram of a system architecture of the computing device 100 for registering a biometric template with the computing device 100. In the example embodiment, the computing device 100 includes a plurality of software applications, including, for example, one or more user applications 202, a biometric registration application 204 and a trusted secure application 206. The user applications 202 and the biometric registration application 204 are typically stored in the memory device 104 for execution therefrom. The trusted security application 206 may be stored in the secure element 112 for execution therefrom. The trusted security application 206 may be securely hosted by the secure element 112 such that only the trusted security application 206 may have access to one or more biometric templates, such as the encrypted biometric template 210, stored on the secure element 112.

In the example embodiment, a user application 202 receives an input single, for example from a user of the computing device 100 via a user interface (not shown) presented on the display 120 (shown in FIG. 1), to register a user's biometric data for use with the user application 202 (e.g., for user authentication, authorization, identity, etc.). For example, in one embodiment, the user application 202 may be a digital wallet application. A user may select to register his or her biometric data for access to payment data associated with the digital wallet application.

The user application 202 is coupled in communication to the biometric registration application 204. The user application 202 transmits a registration request to the biometric registration application 204 to register the user's biometric data.

The biometric registration application 204 instructs the user, for example, via the user interface presented on the display 120, to supply his or her biometric data, as is described further herein. In certain embodiments, the biometric registration application 204 may indicate a certain type of biometric data to supply, for example, based on the type or type(s) of biometric sensors available with the computing device 100. For example, in some embodiments, the biometric sensor(s) 114 may include a fingerprint scanner, a camera, an optical imager, a retinal scanner, etc. As noted above, in an embodiment described herein, the biometric sensor 114 is a fingerprint scanner and the biometric data is associated with a user's fingerprint. The user then supplies his or her biometric data, for example, via the biometric sensor(s) 114.

The biometric registration application 204 receives the supplied biometric data and generates a biometric template, such as the biometric template 208, using the received biometric data. As depicted in FIG. 2, the biometric registration application 204 is coupled in communication with the trusted security application 206, which is stored on the secure element 112. After generating the biometric template 208, the biometric registration application 204 transmits the biometric template 208 to the trusted security application 206.

Upon receipt of the biometric template 208 from the biometric registration application 204, the trusted security application 206 encrypts the biometric template 208 to generate an encrypted biometric template 210. The trusted security application 206 stores the encrypted biometric template 210 on the secure element 112. The trusted security application 206 encrypts the biometric template 208 using, for example, an encryption key 212 stored on the secure element 112.

Figure 3:
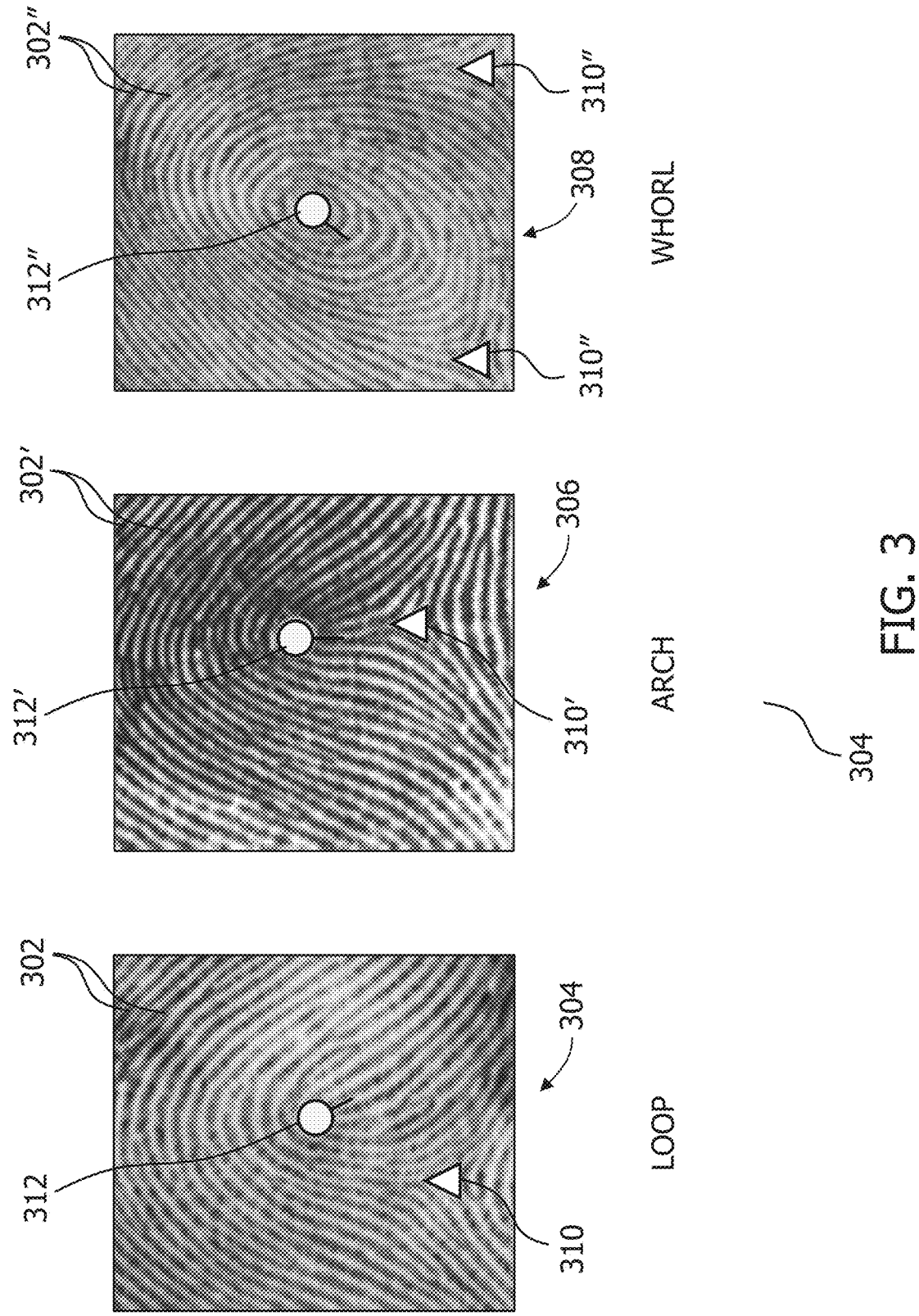
FIG. 3 depicts example fingerprint patterns detected by a biometric sensor of the computing device of FIG. 1.

FIG. 3 depicts example fingerprint patterns 300, 300', and 300" detected by the biometric sensor 114. In the science of fingerprints, a fingerprint pattern is defined by a plurality of distinctive ridge lines that correspond to ridges on the bulbs on the inside of the end joints of a user's fingers and thumbs. In FIG. 3, the ridge lines (examples indicated by reference characters 302, 302', and 302", respectively) are depicted as the plurality of black lines within the area of the biometric sensor 114 and which are detected by the biometric sensor 114. Fingerprint ridges have definite contours and appear in several general pattern types, each with general and specific variations of the pattern, dependent on the shape and relationship of the ridges. In general, a fingerprint pattern is resolved into three (3) general groups of patterns, each group bearing the same general characteristics or family resemblance. The three (3) general groups include the following: I) Loop; II) Arch; and III) Whorl.

A loop, such as the loop depicted at 304, is a type of fingerprint pattern in which one or more of the ridge lines 302 enter on either side of the impression, recurve, touch or pass an imaginary line drawn from a delta 310 to a core 312 of the pattern, and terminate or tend to terminate on or toward the same side of the impression from which the ridge or ridges entered. The Loop group is further divided into sub-groups representing differences existing between the patterns in the Loop group. The sub-groups for the Loop group include a) radial loop and b) ulnar loop. The terms "radial" and "ulnar" are derived from the radius and ulna bones of the forearm. Loops which flow in the direction of the ulna bone (toward the little finger) are called ulnar loops and those which flow in the direction of the radius bone are called radial loops.

An arch, such as the arch depicted at 306, is a type of fingerprint pattern in which one or more of the ridges enter on one side of the impression and flow or tend to flow out the other with a rise or wave in the center. The Arch group is further divided into sub-groups representing differences existing between the patterns in the Arch group. The sub-groups for the Arch group include a) plain arch and b) tented arch. A plain arch is defined by rising ridges that are generally continuous, and not ending. In a tented arch, the ridge or ridges at the center of the arch do not flow continuously through the arch shape. For example, the ridge or ridges at the center form a definite angle (i.e., 90° or less)

or form an upthrust (i.e., an ending ridge rising from the horizontal plane). An arch includes a core 312' and may include a delta 310'.

A whorl, such as the whorl depicted at 308, is a type of fingerprint pattern in which the ridges define at least two deltas, depicted as 310", with a recurve in front in each delta. Typically, the center of the recurve ridge or spiral pattern defines the core 312". The Whorl group is further divided into sub-groups representing differences existing between the patterns in the Whorl group. The sub-groups for the Whorl group include a) plain whorl, b) central pocket loop, c) double loop, and d) accidental whorl. A plain whorl has two deltas and at least one ridge making a complete circuit, which may be spiral, oval, circular, or any variant of a circle. An imaginary line drawn between the two deltas must touch or cross at least one of the recurving ridges within the inner pattern area. A central pocket loop has two deltas and at least one ridge making a complete circuit, which may be spiral, oval, circular, or any variant of a circle. An imaginary line drawn between the two deltas, however, must not touch or cross any of the recurving ridges within the inner pattern area. A double loop consists of two separate loop formations, with two separate and distinct sets of shoulders, and two deltas. An accidental whorl is a pattern consisting of a combination of two different types of pattern, with the exception of the plain arch, with two or more deltas; a pattern which possesses some of the requirements for two or more different types; or a pattern which conforms to none of the definitions.

Figure 4:
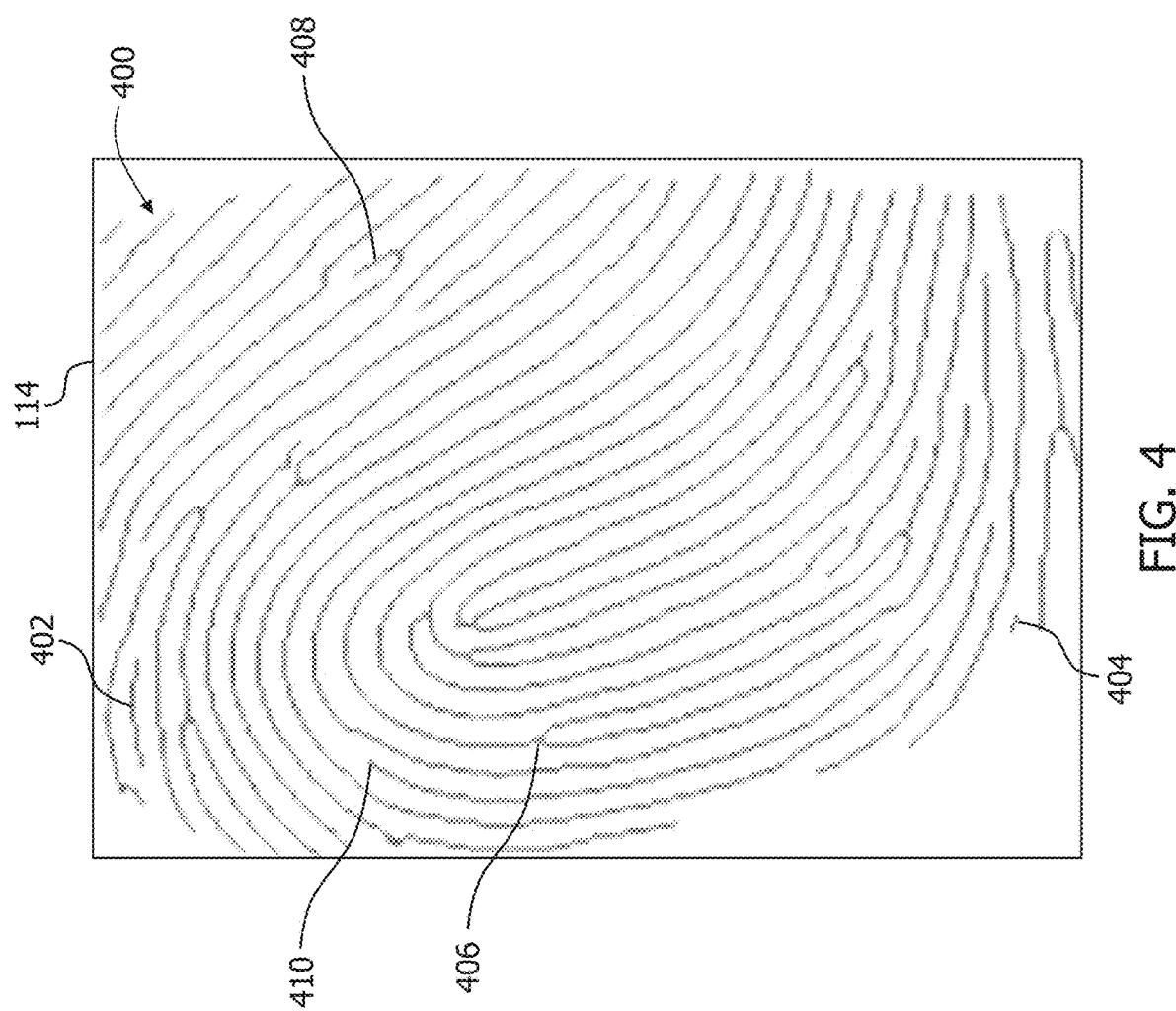
FIG. 4 depicts an example fingerprint pattern detected by the biometric sensor of the computing device of FIG. 1.

FIG. 4 depicts an example fingerprint pattern 400 detected by the biometric sensor 114. The ridges that define a fingerprint pattern, such as the fingerprint pattern 400, include local ridge features known as minutiae. Fingerprint minutiae define local anomalies within the ridge patterns. Minutiae typically include various features such as the following: a ridge termination, an independent (or short) ridge, a ridge bifurcation, a ridge eye or lake (i.e., where a ridge bifurcates and the two resultant ridges merge back together), a point or island, a spur, a crossover, and a bridge (i.e., where a short ridge extends between and connects to adjacent ridges). Referring to FIG. 4, the example fingerprint pattern 400 includes various fingerprint minutiae comprising, for example, an independent (or short) ridge 402, a point or island 404, a ridge bifurcation 406, a spur 408, and a ridge termination 410. These fingerprint minutiae are simply examples labeled for clarity, and as readily depicted in FIG. 4, the fingerprint pattern 400 includes a plurality of fingerprint minutia (labeled and unlabeled).

Figure 5:
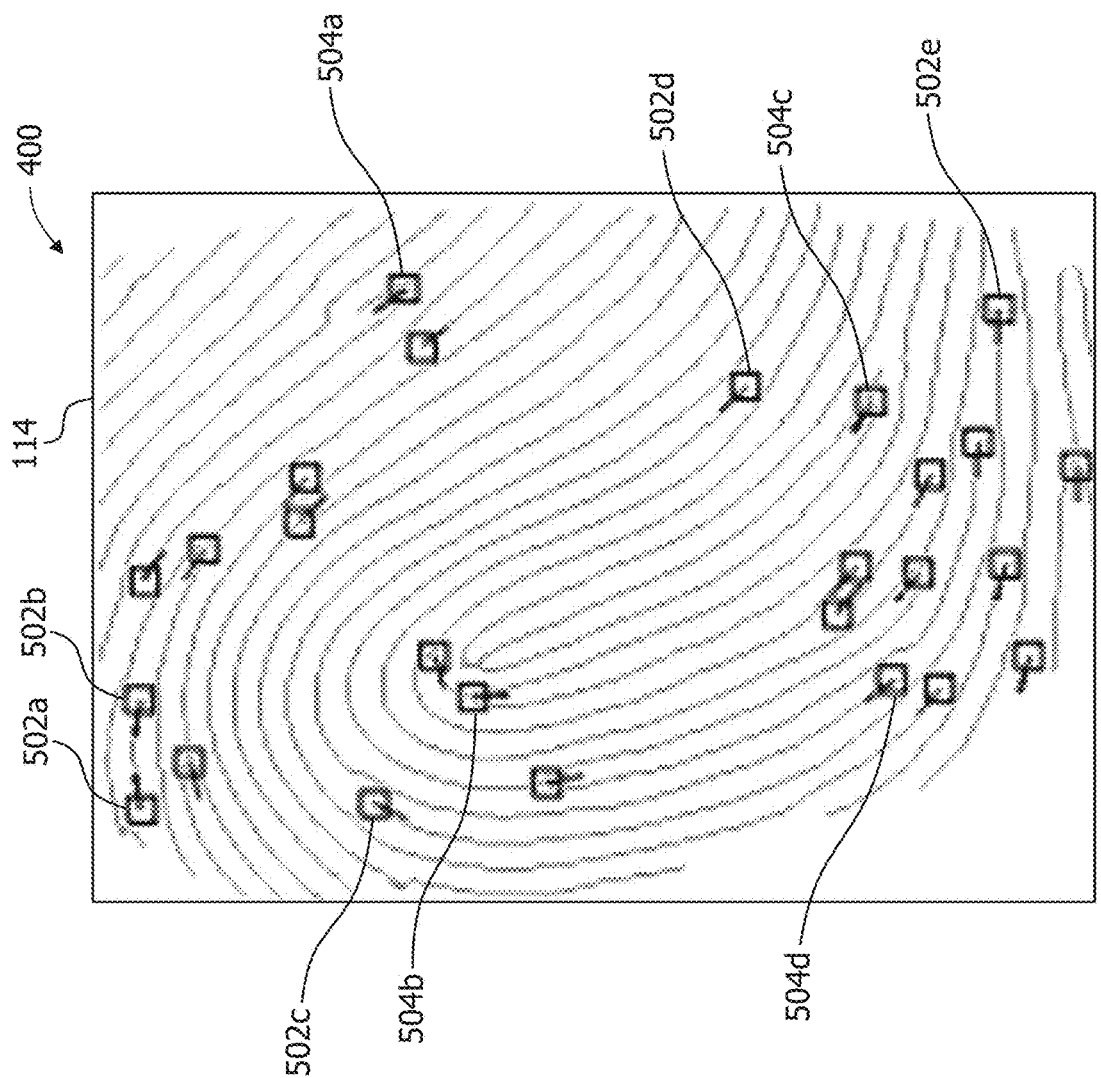
FIG. 5 depicts the fingerprint pattern of FIG. 4, along with a plurality of the fingerprint minutia identified and labeled.

FIG. 5 depicts the fingerprint pattern 400 detected by the biometric sensor 114 along with a plurality of the fingerprint minutia identified and labeled. In the exemplary embodiment, a user's fingerprint can be represented by the fingerprint's distinctive minutiae points. Ridge endings and ridge bifurcations are the most commonly used minutia types since all other types of minutiae (discussed above) are based on a combination of these two types. As depicted in FIG. 5, the plurality of the fingerprint minutia identified and labeled include, for example a plurality of ridges endings, represented by reference characters 502*a-e*, and a plurality of ridge bifurcations, represented by reference characters 504*a-d*. It is noted that only some of the depicted fingerprint minutiae are identified and labeled for clarity. Other fingerprint minutiae may be identified and labeled to facilitate generating a biometric template, as described further herein.

Figure 6:
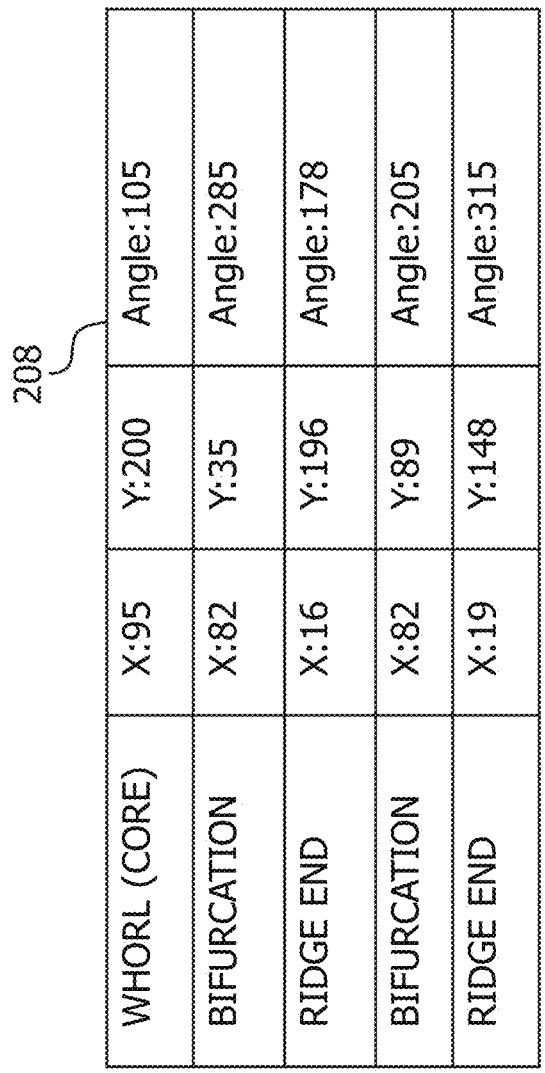
FIG. 6 is a schematic of a biometric template generated by the computing device of FIG. 1.

As depicted in FIG. 6, in the example embodiment, when respective fingerprint features and minutiae are identified, the type, location, and orientation of each is captured and stored as part of the biometric template 208. The location, for example, may be determined based on a predefined coordinate system (not shown) associated with the biometric sensor 114. In an example embodiment, the coordinate system may be defined relative to edges of the biometric sensor, a center point of the biometric sensor, etc. In any instance, however, the origin and orientation of a coordinate system of the biometric sensor is predefined. An orientation, or angle, of respective fingerprint features and minutiae may be defined as an angle of a projected line that is tangent or perpendicular to the ridge at the minutiae location or a projected axis of the feature. Thus, a user's unique fingerprint is represented in the biometric template 208 as a plurality of fingerprint features and minutia types and a location and orientation of each respective feature and minutiae. The plurality of fingerprint minutiae and features together define an orientation map that is distinct enough to robustly distinguish between fingerprints.

Exemplary Computer-Implemented Method for Registering a Biometric Template

Figure 7:
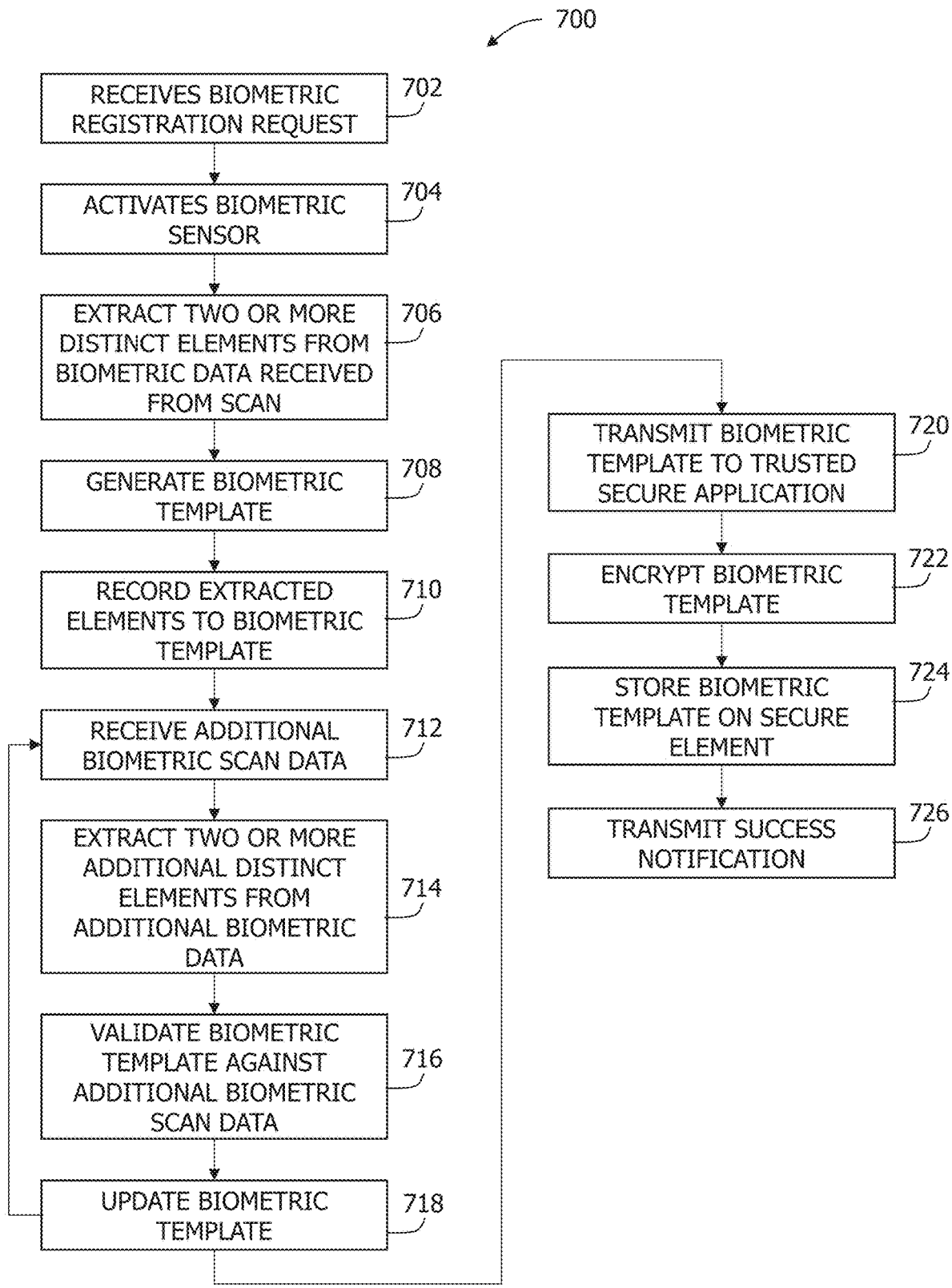
FIG. 7 is a flowchart illustrating an exemplary computer-implemented method for registering an encrypted biometric template, in accordance with an aspect of the invention.

FIG. 7 is a flowchart illustrating an exemplary computer-implemented method 700 for registering an encrypted biometric template, such as the encrypted biometric template 210 (shown in FIG. 2), in accordance with an aspect of the invention. The operations described herein may be performed in the order shown in FIG. 7 or may be performed in a different order, unless so stated and/or except as will be readily apparent to those skilled in the art. Furthermore, according to some aspects of the present invention, some operations may be optional and may be performed concurrently as opposed to sequentially.

The computer-implemented method 700 is described below, for ease of reference, as being executed by exemplary devices and components introduced with the embodiments illustrated in FIGS. 1-6. Preferably, the method 700 may be implemented by a user (not shown) of the user computing device 100 (shown in FIG. 1). In the exemplary embodiment, the method 700 relates to the capture and registration of a user's biometric data. While operations within the method 700 are described below regarding the user computing device 100, the method 700 may be implemented on other computing systems and/or devices through the utilization of processors, biometric sensors, hardware, software, firmware, or combinations thereof. However, a person having ordinary skill will appreciate that responsibility for all or some of such actions may be distributed differently among such devices or other computing devices without departing from the spirit of the present disclosure.

One or more computer-readable medium(s) may also be provided. The computer-readable medium(s) may include one or more executable programs stored thereon, wherein the program(s) instruct one or more processors or processing units to perform all or certain of the steps outlined herein. The program(s) stored on the computer-readable medium(s) may instruct the processor or processing units to perform additional, fewer, or alternative actions, including those discussed elsewhere herein.

In the example embodiment, at operation 702, the biometric registration application 204 (shown in FIG. 2) receives a biometric registration request to register or enroll a biometric template with the computing device 100 (shown in FIG. 1). In an embodiment, a user (not shown) may initiate a request to register his or her biometric data with the computing device 100, for example, via a user application, such as the user application 202 (shown in FIG. 2). The user application 202 may call the biometric registration application 204 to initiate a biometric registration process. In other embodiments, the user may initiate the biometric registration application 204 directly, for example, via user input to the computing device 100 at the input device 118 (shown in FIG. 1).

At operation 704, the computing device 100 activates the biometric sensor 114 and the user scans his or her biometric feature into the computing device 100, for example, via the biometric sensor 114 (shown in FIG. 1). As noted above, in the example embodiment, the biometric scanner is a fingerprint scanner configured to capture at least a portion of the user's fingerprint. In an embodiment, the biometric registration application 204 may prompt the user, via the display 120 (shown in FIG. 1), to scan his or her biometric feature at the biometric sensor 114. For example, the biometric registration application 204 may request that the user place his or her finger on the biometric sensor 114 so his or her fingerprint may be scanned.

At operation 706, two or more distinct elements of the user's biometric feature are extracted (identified) from the biometric data received from the biometric sensor scan. For example, in a preferred embodiment using a fingerprint, the biometric registration application 204 identifies a pattern type (e.g., Loop, Arch, or Whorl), a core of the pattern type (e.g., core 312, 312', 312" (shown in FIG. 3)), and a location and orientation of the pattern type (using the core) relative to a coordinate system of the biometric sensor 114. In addition, the biometric registration application 204 extracts (identifies) at least one additional minutiae of the user's biometric feature (i.e., fingerprint). Each extracted (identified) minutiae is characterized by type, location, and orientation relative to the coordinate system of the biometric sensor 114.

In one or more embodiments, the biometric registration application 204 may only characterize minutiae located within a predefined distance of the identified core. For example, a threshold distance relative to a core may be predefined and each minutia within the threshold distance may be characterized, whereas each minutia identified outside of the predefined distance may be temporarily disregarded.

At operation 708, the biometric registration application 204 may generate a biometric template, such as the biometric template 208, for the user's fingerprint. For example, the biometric registration application 204 may write the biometric template to the memory device 104.

At operation 710, the biometric registration application 204 records each feature (i.e., pattern type and/or minutiae) that it characterized in operation 706 to the biometric template. For example, referring to FIG. 6, the biometric registration application 204 may write an entry for each distinct feature, wherein each entry includes characterization data of the feature, including, the feature type, location, and orientation. In this manner, the biometric template 208 may be used to characterize the location and orientation of each feature relative to each other, defining an orientation map.

At operation 712, the user scans his or her biometric feature into the computing device 100 an additional time. In an embodiment, the biometric registration application 204 may prompt the user, via the display 120, to remove his or her biometric feature and scan his or her biometric feature an additional time. For example, the biometric registration application 204 may request that the user lift and replace his or her finger on the biometric sensor 114 so his or her fingerprint may be scanned again.

At operation 714, two or more additional distinct elements (e.g., minutiae) of the user's biometric feature are identified, extracted, and characterized. For example, the biometric registration application 204 identifies the pattern type, the core of the pattern type, and a location and orientation of the pattern type (using the core) relative to the coordinate system of the biometric sensor 114. In addition, the biometric registration application 204 identifies a plurality of additional minutiae of the user's biometric feature (i.e., fingerprint). Each identified minutiae is characterized by type, location, and orientation relative to the coordinate system of the biometric sensor 114.

At operation 716, the biometric registration application 204 validates the biometric template against the additional scan. For example, the biometric registration application 204 compares the identified pattern type, the core of the pattern type, and the location and orientation of the pattern type, along with the additional minutiae and associated characteristics to the data written in the biometric template 208. If each feature and its location/orientation relative to each other feature of the additional scan matches the data stored in the biometric template 208, the biometric registration application 204 validates the biometric template. Because the location and orientation of each feature is determined relative to the coordinate system of the biometric sensor 114, the orientation map of the data stored in the biometric template 208 and the orientation map defined by the features characterized in the additional scan can be geometrically transformed and rotated to establish a match.

At operation 718, the biometric registration application 204 updates the biometric template 208, for example, by recording a plurality of new minutiae that the biometric registration application 204 characterized in operation 716 to the biometric template. Thus, the biometric registration application 204 performs nested validation as a part of each feature extraction operation. It is contemplated that operation 712-718 may be repeated one or more additional times until the biometric template 208 includes sufficient data to characterize a user's fingerprint. In an embodiment, the number of minutiae to sufficiently characterize a user's fingerprint is in the range between and including about twenty-five (25) minutiae and about one hundred (100) minutiae. In certain more preferred embodiments, the number of minutiae stored in the biometric template 208 is in the range between and including about forty (40) minutiae and about eighty (80) minutiae.

At operation 720, after completing the biometric template 208, the biometric registration application 204 transmits the biometric template 208 to the trusted secure application 206, which is stored on the secure element 112. In an embodiment, the biometric template 208 is only temporarily stored on the memory device 104, for example, during its creation. After transmission to the trusted security application 206, the biometric template 208 may be deleted from the memory device 104.

At operation 722, the trusted secure application 206 encrypts the biometric template 208 to create the encrypted biometric template 210. For example, the trusted security application 206 encrypts the biometric template 208 using, for example, an encryption key 212 stored on the secure element 112. In some examples, the encryption key 212 may be generated for use with the specific encrypted biometric template 210 (i.e., unique to a specific encrypted biometric template). In certain embodiments, a single encryption key 212 (e.g., a shared key) may be used by the trusted security application 206 to encrypt a plurality of biometric templates.

At operation 724, the trusted secure application 206 stores the encrypted biometric template 210 on the secure element 112. It is contemplated, that in some embodiments, trusted secure application 206 may transmit a copy of the encrypted biometric template 210 to the biometric registration application 204 for storage on the memory device 104.

In some embodiments, at operation 726, the trusted security application 206 transmits a notification (indicating successful encryption and storage of the biometric template) to the biometric registration application 204 after encrypting and storing the biometric template 208 on the secure element 112. At operation 728, the biometric registration application 204 may, in some embodiments, transmit a notification to the user application 202 indicating that the biometric registration process is complete.

Any actions, functions, operations, and the like recited herein may be performed in the order shown in the figures and/or described above or may be performed in a different order. Furthermore, some operations may be performed concurrently as opposed to sequentially. Although the methods are described above, for the purpose of illustration, as being executed by an example system and/or example physical elements, it will be understood that the performance of any one or more of such actions may be differently distributed without departing from the spirit of the present invention.

A computer-readable storage media or medium comprising a non-transitory medium may include an executable computer program stored thereon, wherein the program instructs one or more processing elements to perform some or all of the operations described herein, including some or all of the operations of the computer-implemented method. The computer program stored on the computer-readable medium may instruct the processor and/or other components of the system to perform additional, fewer, or alternative operations, including those discussed elsewhere herein.

Additional Considerations

All terms used herein are to be broadly interpreted unless otherwise stated. For example, the term "payment card" and the like may, unless otherwise stated, broadly refer to substantially any suitable transaction card, such as a credit card, a debit card, a prepaid card, a charge card, a membership card, a promotional card, a frequent flyer card, an identification card, a prepaid card, a gift card, and/or any other device that may hold payment account information, such as mobile phones, Smartphones, personal digital assistants (PDAs), key fobs, and/or computers. Each type of transaction card can be used as a method of payment for performing a transaction.

As used herein, the term "cardholder" may refer to the owner or rightful possessor of a payment card. As used herein, the term "cardholder account" may refer specifically to a PAN or more generally to an account a cardholder has with the payment card issuer and with which the PAN is or was associated. As used herein, the term "merchant" may refer to a business, a charity, or any other such entity that can generate transactions with a cardholder account through a payment card network.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

Although the present application sets forth a detailed description of numerous different embodiments, it should be understood that the legal scope of the description is defined by the words of the claims and equivalent language. The detailed description is to be construed as exemplary only and does not describe every possible embodiment because describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order recited or illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein. The foregoing statements in this paragraph shall apply unless so stated in the description and/or except as will be readily apparent to those skilled in the art from the description.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processor, may be implemented as special purpose or as general purpose. For example, the processor may comprise dedicated circuitry or logic that is permanently configured, such as an application-specific integrated circuit (ASIC), or indefinitely configured, such as a field-programmable gate array (FPGA), to perform certain operations. The processor may also comprise programmable logic or circuitry (e.g., as encompassed within a general-purpose processor or other programmable processor) that is temporarily configured by software to perform certain operations. It will be appreciated that the decision to implement the processor as special purpose, in dedicated and permanently configured circuitry, or as general purpose (e.g., configured by software) may be driven by cost and time considerations.

Accordingly, the term "processor" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processor is temporarily configured (e.g., programmed), each of the processors need not be configured or instantiated at any one instance in time. For example, where the processor includes a general-purpose processor configured using software, the general-purpose processor may be configured as respective different processors at separate times. Software may accordingly configure the processor to constitute a particular hardware configuration at one instance of time and to constitute a different hardware configuration at a different instance of time.

Computer hardware components, such as transceiver elements, memory elements, processors, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at separate times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processors may be located in a specific location (e.g., within a home environment, an office environment or as a server farm), while in other embodiments the processors may be distributed across a number of locations.

Unless specifically stated otherwise, discussions herein using words such as "processing," "computing," "calculating," "determining," "presenting," "displaying," or the like may refer to actions or processes of a machine (e.g., a computer with a processor and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

Although the disclosure has been described with reference to the embodiments illustrated in the attached figures, it is noted that equivalents may be employed, and substitutions made herein, without departing from the scope of the disclosure as recited in the claims.

Having thus described various embodiments of the disclosure, what is claimed as new and desired to be protected by Letters Patent includes the following:

1. A computer-implemented method performed by a computing device, the method comprising:
    initiating a biometric registration process on a computing device of a user, the computing device including a display and a biometric sensor;
    receiving, during the biometric registration process, a first scan of a biometric feature of the user from the biometric sensor, the first scan including first biometric data;
    extracting, during the biometric registration process, two or more distinct elements of the biometric feature from the first biometric data;
    characterizing, during the biometric registration process, the first biometric data to generate first characterization data, the first characterization data defining a first orientation map of the two or more distinct elements relative to a coordinate system of the biometric sensor;
    writing, during the biometric registration process, a biometric template to a memory device of the computing device;
    recording, during the biometric registration process, the first characterization data for each of the two or more distinct elements in the biometric template;
    after recording the first characterization data in the biometric template, prompting the user, via the display, to remove the biometric feature from the biometric sensor;
    prompting the user, via the display, to replace the biometric feature on the biometric sensor;
    receiving, during the biometric registration process, an additional scan of the biometric feature from the biometric sensor, the additional scan including second biometric data;
    extracting, during the biometric registration process, two or more additional distinct elements of the biometric feature from the second biometric data;
    characterizing, during the biometric registration process, the second biometric data to generate second characterization data, the second characterization data defining a second orientation map of the two or more additional distinct elements relative to the coordinate system of the biometric sensor;
    validating, during the biometric registration process, the biometric template against the second biometric data;
    after validating the biometric template, updating, during the biometric registration process, the biometric template with the second characterization data; and
    in response to validating and updating the biometric template, transmitting a notification that the biometric registration process is complete.

2. The computer-implemented method in accordance with claim 1, further comprising:
    extracting the two or more additional distinct elements of the biometric feature from the second biometric data.

3. The computer-implemented method in accordance with claim 1, further comprising:
receiving a biometric registration request from a user application stored in the memory device.

4. The computer-implemented method in accordance with claim 1, further comprising:
after updating the biometric template, transmitting the biometric template to a trusted secure application stored on a secure element of the computing device.

5. The computer-implemented method in accordance with claim 4, further comprising:
after transmitting the biometric template to the trusted secure application, deleting the biometric template from the memory device.

6. The computer-implemented method in accordance with claim 4, further comprising:
encrypting the biometric template using the trusted secure application, thereby generating an encrypted biometric template.

7. The computer-implemented method in accordance with claim 1, wherein the first and second characterization data includes, for each respective distinct element, the following: a type of distinct element, a location of the distinct element relative to the biometric sensor, and an orientation of the distinct element relative to the biometric sensor.

8. A computing device comprising:
a biometric sensor;
a display;
a processor; and
a memory device including computer-readable instructions stored thereon, that when executed by the processor, cause the processor to perform operations comprising:
initiating a biometric registration process;
receiving, during the biometric registration process, a first scan of a biometric feature of a user from the biometric sensor, the first scan including first biometric data;
extracting, during the biometric registration process, two or more distinct elements of the biometric feature from the first biometric data;
characterizing, during the biometric registration process, the first biometric data to generate first characterization data, the first characterization data defining a first orientation map of the two or more distinct elements relative to a coordinate system of the biometric sensor;
writing, during the biometric registration process, a biometric template to the memory device;
recording, during the biometric registration process, the first characterization data for each of the two or more distinct elements in the biometric template;
after recording the first characterization data in the biometric template, prompting the user, via the display, to remove the biometric feature from the biometric sensor;
prompting the user, via the display, to replace the biometric feature on the biometric sensor;
receiving, during the biometric registration process, an additional scan of the biometric feature from the biometric sensor, the additional scan including second biometric data;
extracting, during the biometric registration process, two or more additional distinct elements of the biometric feature from the second biometric data;
characterizing, during the biometric registration process, the second biometric data to generate second characterization data, the second characterization data defining a second orientation map of the two or more additional distinct elements relative to the coordinate system of the biometric sensor;
validating, during the biometric registration process, the biometric template against the second biometric data;
after validating the biometric template, updating, during the biometric registration process, the biometric template with the second characterization data; and
in response to validating and updating the biometric template, transmitting a notification that the biometric registration process is complete.

9. The computing device in accordance with claim 8, the computer-readable instructions causing the processor to perform an operation comprising extracting the two or more additional distinct elements of the biometric feature from the second biometric data.

10. The computing device in accordance with claim 8,
the memory device further including a user application stored thereon,
the computer-readable instructions causing the processor to perform an operation comprising receiving a biometric registration request from the user application.

11. The computing device in accordance with claim 8,
the computing device further comprising a secure element having a trusted secure application stored thereon,
the computer-readable instructions causing the processor to perform an operation comprising transmitting the biometric template to the trusted secure application after updating the biometric template.

12. The computing device in accordance with claim 11, the computer-readable instructions causing the processor to perform an operation comprising deleting the biometric template from the memory device after transmitting the biometric template to the trusted secure application.

13. The computing device in accordance with claim 11, the computer-readable instructions causing the processor to perform an operation comprising encrypting the biometric template using the trusted secure application, thereby generating an encrypted biometric template.

14. The computing device in accordance with claim 8, wherein the first and second characterization data includes, for each respective distinct element, the following: a type of distinct element, a location of the distinct element relative to the biometric sensor, and an orientation of the distinct element relative to the biometric sensor.

15. A non-transitory computer readable storage medium comprising computer readable instructions that, when executed by a processor, cause the processor to perform operations comprising:
initiating a biometric registration process on a computing device of a user, the computing device including a display and a biometric sensor;
receiving, during the biometric registration process, a first scan of a biometric feature of the user from the biometric sensor, the first scan including first biometric data;
extracting, during the biometric registration process, two or more distinct elements of the biometric feature from the first biometric data;
characterizing, during the biometric registration process, the first biometric data to generate first characterization data, the first characterization data defining a first orientation map of the two or more distinct elements relative to a coordinate system of the biometric sensor;
writing, during the biometric registration process, a biometric template to a memory device of a computing device comprising the processor;

recording, during the biometric registration process, the first characterization data for each of the two or more distinct elements in the biometric template;

after recording the first characterization data in the biometric template, prompting the user, via the display, to remove the biometric feature from the biometric sensor;

prompting the user, via the display, to replace the biometric feature on the biometric sensor;

receiving, during the biometric registration process, an additional scan of the biometric feature from the biometric sensor, the additional scan including second biometric data;

extracting, during the biometric registration process, two or more additional distinct elements of the biometric feature from the second biometric data;

characterizing, during the biometric registration process, the second biometric data to generate second characterization data, the second characterization data defining a second orientation map of the two or more additional distinct elements relative to the coordinate system of the biometric sensor;

validating, during the biometric registration process, the biometric template against the second biometric data;

after validating the biometric template, updating, during the biometric registration process, the biometric template with the second characterization data; and in response to validating and updating the biometric template, transmitting a notification that the biometric registration process is complete.

16. The computer readable storage medium in accordance with claim 15, wherein the computer readable instructions further cause the computer to perform the operation of extracting the two or more additional distinct elements of the biometric feature from the second biometric data.

17. The computer readable storage medium in accordance with claim 15, wherein the computer readable instructions further cause the computer to perform the operation of receiving a biometric registration request from a user application stored in the memory device.

18. The computer readable storage medium in accordance with claim 15, wherein the computer readable instructions further cause the computer to perform the operation of transmitting the biometric template to a trusted secure application stored on a secure element of the computing device after updating the biometric template.

19. The computer readable storage medium in accordance with claim 18, wherein the computer readable instructions further cause the computer to perform the operation of encrypting the biometric template using the trusted secure application, thereby generating an encrypted biometric template.

20. The computer readable storage medium in accordance with claim 15, wherein the first and second characterization data includes, for each respective distinct element, the following: a type of distinct element, a location of the distinct element relative to the biometric sensor, and an orientation of the distinct element relative to the biometric sensor.

* * * * *